United States Patent [19]

Katsunuma

[11] Patent Number: 5,796,515
[45] Date of Patent: Aug. 18, 1998

[54] CATADIOPTRIC OPTICAL SYSTEM

[75] Inventor: Atsushi Katsunuma, Saitama-ken, Japan

[73] Assignee: Nikon Corporation, Tokyo, Japan

[21] Appl. No.: 889,748

[22] Filed: Jul. 8, 1997

[30] Foreign Application Priority Data

Jul. 9, 1996 [JP] Japan ................................. 8-198308

[51] Int. Cl.$^6$ ............................................. G02B 17/00
[52] U.S. Cl. ................ 359/364; 359/355; 359/727; 359/731
[58] Field of Search ........................ 359/362–366, 359/726–732, 744, 771–772, 784, 791, 354–359

[56] References Cited

U.S. PATENT DOCUMENTS

| | | | |
|---|---|---|---|
| 3,022,708 | 2/1962 | Baker | 359/728 |
| 3,110,752 | 11/1963 | Becker | 359/727 |
| 3,252,373 | 5/1966 | Shenker | 359/731 |
| 4,779,966 | 10/1988 | Friedman | 359/355 |

FOREIGN PATENT DOCUMENTS

618253  2/1949  United Kingdom ................. 359/727

*Primary Examiner*—Thong Nguyen
*Attorney, Agent, or Firm*—Klarquist Sparkman Campbell Leigh & Whinston, LLP

[57] ABSTRACT

Catadioptric optical systems are disclosed that comprise, objectwise to imagewise, a positive first lens, a meniscus second lens having a convex face oriented objectwise, a meniscus third lens having a concave face oriented objectwise, and a concave spherical mirror having a concave face oriented objectwise. Light from an object passes through the first through third lenses and reflects from the concave mirror to form an image between the third lens and the concave mirror. The system satisfies the condition $|f_{123}|/f > 10$, where $f_{123}$ is the aggregate focal length of the first through third lenses, and $f$ is an overall focal length of the system. The first and second lenses are preferably made of a specified optical material, collectively have a positive refractive power, and fulfill the condition $|f_{12}|/|f'_{12}| > 1$, where $f_{12}$ is the aggregate focal length of the first and second lenses, and $f'_{12}$ is the focal length of a lens that would be formed by filling the space between the first and second lenses with the specified optical material. The system can also have a fourth lens positioned between the concave mirror and the image plane for correcting image plane curvature.

19 Claims, 8 Drawing Sheets

CATADIOPTRIC OPTICAL SYSTEM

FIELD OF THE INVENTION

This invention pertains to catadioptric optical systems, particularly for photography and related applications.

BACKGROUND OF THE INVENTION

Figure 1:
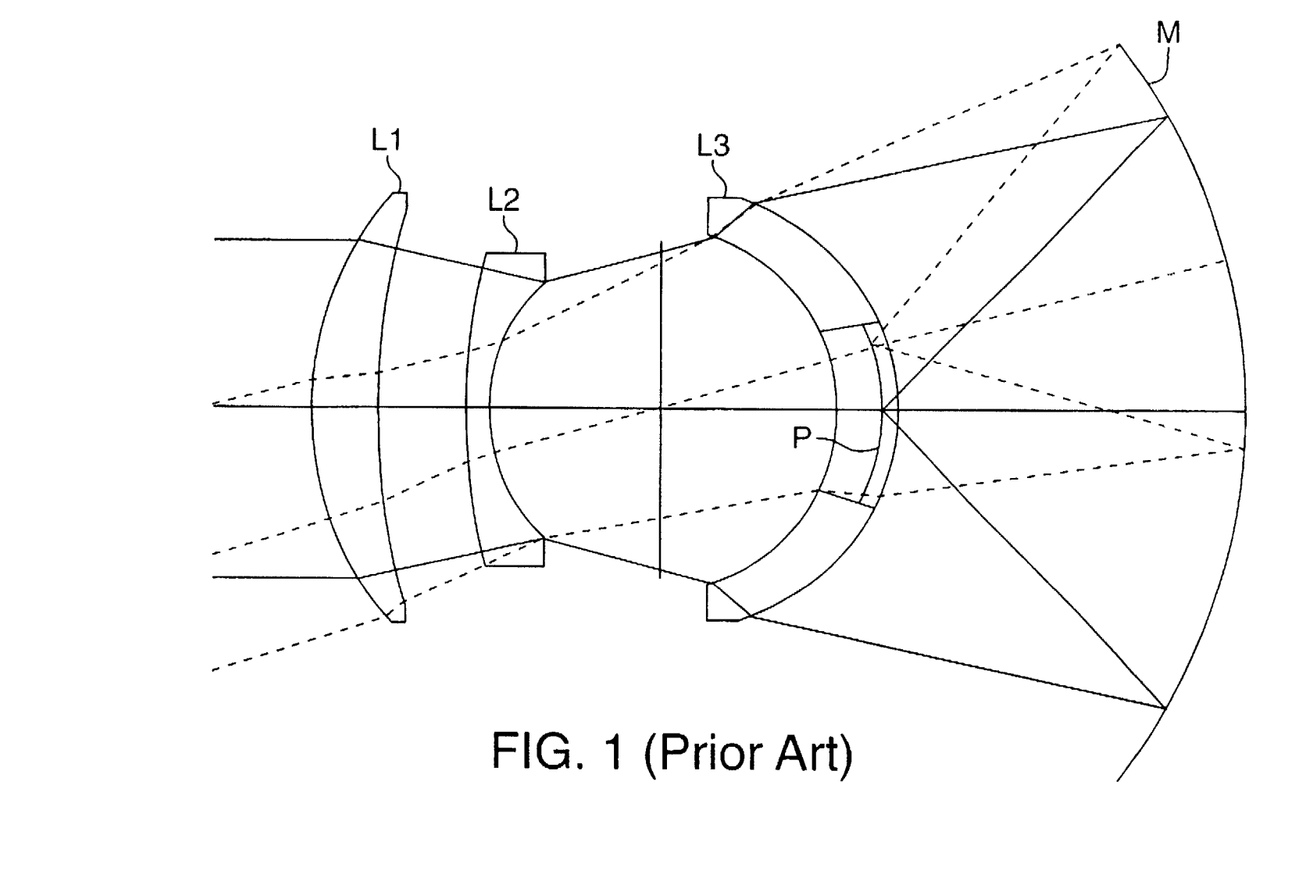
FIG. 1 is a schematic optical diagram of a prior-art catadioptric optical system.

A prior-art catadioptric optical system is shown in FIG. 1 as disclosed, for example, in C. G. Wynne, "New Wide-Aperture Cata-Dioptric Systems," *Mon. Not. R. Astr. Soc.* 107:356–368 (1947). The catadioptric optical system of FIG. 1 consists of, objectwise to imagewise (i.e., from left to right in the figure), a positive meniscus lens L1 having a convex face oriented objectwise, a negative meniscus lens L2 having a convex face oriented objectwise, a positive meniscus lens L3 having a concave face oriented objectwise, and a concave spherical mirror M having a concave face oriented objectwise. The three lenses L1–L3 are formed from the same optical material, and provide some correction of spherical aberrations generated by the concave spherical mirror M.

The catadioptric optical system shown in FIG. 1 was developed from an optical system consisting of a concave spherical mirror and two meniscus lenses having concave faces oriented toward each other. In such an optical system, the objectwise meniscus lens was axially very thick at its center, making it a so-called "thick" meniscus lens. Bulk materials of sufficiently high quality for a thick meniscus lens were difficult to obtain. Therefore, in order to avoid using a thick meniscus lens, the thick meniscus lens was replaced with two lenses, in a manner so as not to destroy the overall aberration balance. In other words, the first lens L1 and the second lens L2 of the catadioptric optical system illustrated in FIG. 1 were effectively "divided" from a single thick meniscus lens.

As a consequence of the division of a single thick meniscus lens into two lenses L1 and L2, the objectwise face of the first lens L1 has the same radius of curvature as the objectwise face of the original thick meniscus lens, and the imagewise face of the second lens L2 has the same radius of curvature as the imagewise face of the original thick meniscus lens. The axial distance between the objectwise face of the first lens L1 and the imagewise face of the second lens L2 matches the center thickness of the original thick meniscus lens. The aggregate focal length and aggregate focal point position of the first and second lenses L1 and L2 match the focal length and focal point position of the original thick meniscus lens. As a result of these relationships between the first and second lenses L1, L2, and the original thick meniscus lens, the air space between the first lens L1 and second lens L2 has no effect on the aberration of the first and second lenses L1, L2 collectively compared to the original thick meniscus lens. That is, the air space has (or, the facing surfaces of lenses L1 and L2 have) no effect on the aberration of the optical system as a whole.

In the catadioptric optical system shown in FIG. 1, light from the object passes through the first lens L1, the second lens L2, the third lens L3, and is reflected from the concave spherical mirror M to form an image on a curved image surface located near the third lens L3. Thus, prior-art catadioptric optical systems of this type required a curved photographic dry plate or photographic film shaped to match the image surface.

While prior-art catadioptric optical systems of a type shown in FIG. 1 possessed three lenses L1–L3, the potential aberration-correcting capabilities of such three-lens configurations were not fully exploited. Specifically, such prior-art systems exhibited a large amount of chromatic aberration, and spherical aberration was not adequately reduced.

Prior-art catadioptric optical systems of the type described above are generally wide-angle and have small F-numbers. In systems in which the image surface is formed in the light flux, the amount of the light flux that is obstructed increases with increasing image size. Image size tends to increase with increasing field of view. Thus, as field of view increases (i.e., as the system is made more wide-angle), F-number generally increases. In current optical systems, however, the demand for a field of view as wide as in prior-art catadioptric optical systems is less than the demand for improved aberration performance (imaging performance).

It is often desirable in present optical systems to use CCDs (charge-coupled devices) as image-pickup elements. CCDs are typically flat. Thus it is difficult to use a CCD as an image-pickup element in an optical system having a curved image surface, such as the prior-art catadioptric optical system described above. Additionally, in astronomy and similar fields, it is often desirable to utilize a large-surface-area light receiver made by arraying multiple CCD elements in a plane in a mosaic configuration. Optical systems with a curved image surface, such as the prior-art catadioptric optical system described above, cannot be used successfully in such applications.

SUMMARY OF THE INVENTION

The present invention provides catadioptric optical systems that exhibit excellent imaging performance including effectively corrected spherical aberration and chromatic aberration, while maintaining a sufficiently small F-number.

Each of the catadioptric optical systems of the present invention comprises, objectwise to imagewise, a first lens with positive refractive power, a second lens comprising a meniscus lens with its convex face oriented objectwise, a third lens comprising a meniscus lens with its concave face oriented objectwise, and a concave mirror with its concave face oriented objectwise. Light from the object passes through the first lens, the second lens, and the third lens, and is reflected from the concave mirror, to form an image of the object between the third lens and the concave mirror.

Optical systems of the present invention preferably satisfy the condition:

$$|f_{123}|/f>10 \tag{1}$$

wherein $f_{123}$ is the aggregate focal length of the first, second and third lenses, and f is the focal length of the optical system as a whole.

The first and second lenses are both preferably formed from a specified optical material and have a positive aggregate refractive power. The first and second lenses preferably fulfill the condition:

$$|f_{12}|/|f'_{12}|>1 \tag{2}$$

wherein $f_{12}$ is the aggregate focal length of the first and second lenses, and $f'_{12}$ is the resulting focal length of the lens element that would be produced by filling the space between the first lens and the second lens with the specified optical material.

Optical systems according to the invention also preferably comprise a fourth lens, used for correcting image-plane curvature, placed in the optical path between the concave mirror and the image plane. With such a configuration, light from the object passes through the first lens, the second lens, and the third lens, and is reflected from the concave mirror. The light returning from the mirror passes through the fourth lens to form an image of the object between the third lens and the fourth lens.

The foregoing and other objects, features, and advantages of the invention will become more apparent from the following detailed description of example embodiments which proceeds with reference to the accompanying drawings.

DETAILED DESCRIPTION

In an optical system according to the present invention, spherical aberration generated by a concave spherical mirror (having a concave face oriented objectwise) is corrected by the action of (in order from object to image in the optical path upstream of the mirror) a first lens having a positive refractive power, a second lens comprising a meniscus lens having a convex face oriented objectwise, and a third lens comprising a meniscus lens having a concave face oriented objectwise.

In order to effectively correct chromatic aberration in the optical system of the present invention as a whole, the following Conditional Expression (1) is preferably fulfilled:

$$|f_{123}|/f>10 \qquad (1)$$

wherein $f_{123}$ is the aggregate focal length of the first, second and third lenses, and f is the focal length of the optical system as a whole.

By fulfilling Conditional Expression (1), the refractive ensemble consisting of the first, second and third lenses can be nearly afocal. This allows effective correction of on-axis chromatic aberration and transverse chromatic aberration in the optical system as a whole.

It is also preferred that both the first and second lenses be formed from a specified optical material, have a positive aggregate refractive power, and fulfill Conditional Expression (2):

$$f_{12}/f'_{12}>1 \qquad (2)$$

wherein $f_{12}$ is the aggregate focal length of the first and second lenses, and $f'_{12}$ is the focal length of a single lens element that would be formed by filling the space between the first lens and the second lens with the specified optical material.

As discussed above, in prior-art catadioptric optical systems, the aggregate focal length and aggregate focal-point position of the first and second lenses typically match the focal length and focal-point position of a single lens element that would be formed by filling the space between the first lens and the second lens with the same optical material used to make the first and second lenses. As a result, as shown in FIG. 1, the imagewise face of the first lens L1 and the objectwise face of the second lens L2 have virtually no effect on light rays emitted from an object point on the optical axis, and consequently contribute very little to correcting spherical aberration.

In contrast, because optical systems according to the present invention preferably satisfy Conditional Expression 2, the imagewise face of the first lens L1 and the objectwise face of the second lens L2 actively contribute to correction of aberrations. Spherical aberration is especially corrected by the optical system as a whole.

Optical systems according to the present invention also preferably include a fourth lens, for correcting image-plane curvature, in the optical path between the concave mirror and the image plane. Light from the object thus travels through the first lens, the second lens, and the third lens, and is reflected from the concave mirror. Light returning from the mirror passes through the fourth lens to form an image of the object between the third lens and the fourth lens. As a result of including the fourth lens, the Petzval's sum of the optical system is made sufficiently small so that a relatively flat image plane with little astigmatism is produced. The first, second, and third lenses can compensate for any spherical aberration or coma contributed by the fourth lens. It is thus possible to utilize a high-resolution image-pickup device (e.g., a CCD) with a catadioptric optical system of the present invention, in contrast to prior-art catadioptric optical systems that have curved image surfaces with which a CCD cannot be used.

CCD devices generally comprise electronic circuitry on a surface opposite the light-reception surface. Some CCDs are cooled to enhance imaging performance (with such CCDs, the entire CCD device must be housed inside a Dewar vessel or other suitable cryogenic container). In prior-art optical systems such as that shown in FIG. 1, the third lens L3 is adjacent the image plane. Such proximity poses a substantial physical interference between the lens L3 and a CCD device placed at the image surface, particularly if a cryogenic container is used. Optical systems according to the invention, in contrast, have a sufficiently large gap between the image plane and the third lens which would allow use of a CCD (even a cooled CCD) as an image-pickup element without physical interference between the third lens and the CCD device.

EXAMPLE EMBODIMENTS

The catadioptric optical systems in the various example embodiments of this invention comprise, objectwise to imagewise, a first lens L1 with positive refractive power, a second lens L2 comprising a meniscus lens with its convex face oriented objectwise, a third lens L3 comprising a meniscus lens with its concave face oriented objectwise, and a concave mirror M with its concave face oriented objectwise. Light from the object passes through the first lens L1, the second lens L2, and the third lens L3, and is reflected from the concave mirror M to form an image of the object between the third lens L3 and the concave mirror M.

Prior-Art Comparison Example

FIG. 1 as discussed above is a schematic depiction of a prior-art catadioptric optical system provided as a comparison example for several example embodiments of the invention.

The prior-art catadioptric optical system shown in FIG. 1 consists of, from objectwise to imagewise, a positive meniscus lens L1 having its convex face oriented objectwise, a negative meniscus lens L2 having its convex face oriented objectwise, a positive meniscus lens L3 having its concave face oriented objectwise, and a concave spherical mirror M having its concave face oriented objectwise. Light from an object passes through the first lens L1, the second lens L2, and the third lens L3, and is reflected from the concave spherical mirror M to form an image of the object on a curved image surface P. The image surface P has a concave profile oriented objectwise, and is located in the vicinity of the third lens L3.

Table 1 below lists representative optical data for the comparison example. In Table 1, f denotes the focal length of the optical system as a whole, FNO denotes the F number, 2ω denotes the field angle, Face No. denotes the surface number in order objectwise to imagewise along the direction traveled by light from the object to the image surface, r denotes the radius of curvature of the respective face, d denotes the on-axis distance between each face, ED denotes the effective diameter, and n and v denote the refractive index and Abbe number, respectively, at a standard wavelength of λ=588 nm.

In Table 1 below, the sign of a radius of curvature is positive for a convex face oriented objectwise. The sign of an interfacial distance d is positive in the optical path from the object to the concave spherical mirror M, and negative in the optical path from the concave spherical mirror M to the image surface. Because no values other than n=1.613 and v=59.3 were noted in the reference article cited above for lenses L1–L3, lenses L1–L3 are represented as Schott Co. SK4 lenses. The n and v values listed in Table 1 are the catalog values for the SK4 lenses.

TABLE 1

| | f = 100 | FNO = 0.695 | | 2ω = 31° | |
|---|---|---|---|---|---|
| Face No. | r | d | ED | n | v |
| 1 | 144.31 | 27.481 | 180 | 1.61272 | 58.63 |
| 2 | 352.245 | 36.653 | 174.9 | | |
| 3 | 315.592 | 9.161 | 145.2 | 1.61272 | 58.63 |
| 4 | 81.726 | 72.345 | 124.2 | | |
| 5 | ∞ | 72.345 | 135.6 | (Aperture) | |
| 6 | −78.115 | 26.392 | 146.1 | 1.61272 | 58.63 |
| 7 | −91.436 | 141.74 | 172 | | |
| 8 | −252.818 | −150.536 | 303.9 | (Concave spherical mirror M) | |
| 9 | −130 | | | (Image surface) | |

| Values of Conditional Expressions |
|---|
| $f_{123} = -523.93$ |
| $f_{12} = -554.098$ |
| $f'_{12} = -554.11$ |
| Condition (1): $|f_{123}|/f = 5.24$ |
| Condition (2): $|f_{12}/f'_{12}| = 1.00$ |

Figure 2A:
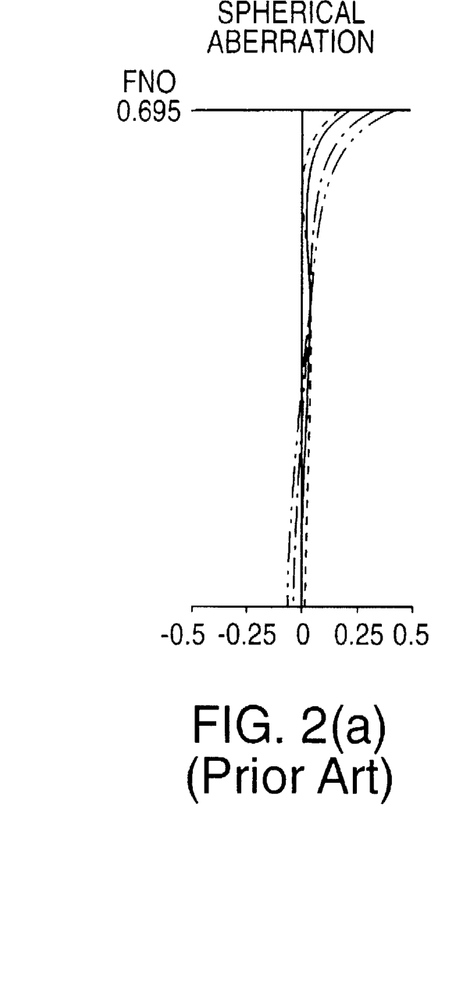
FIGS. 2(a)–2(c) are aberration charts for the prior-art catadioptric optical system of FIG. 1.
Figure 2B:
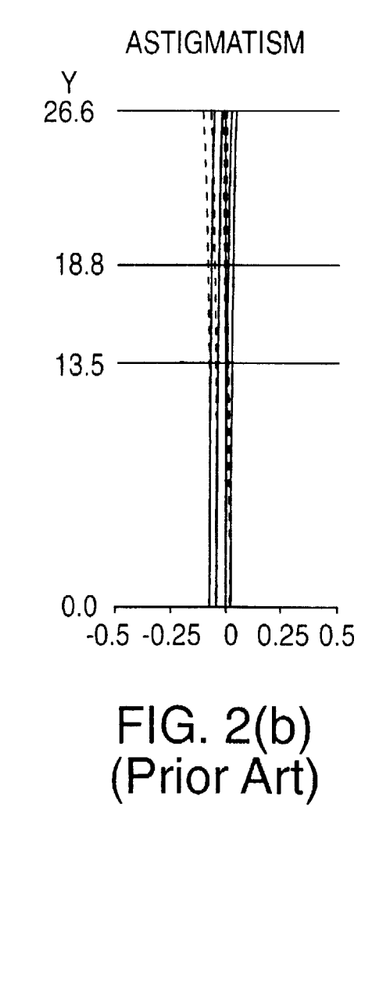
Figure 2C:
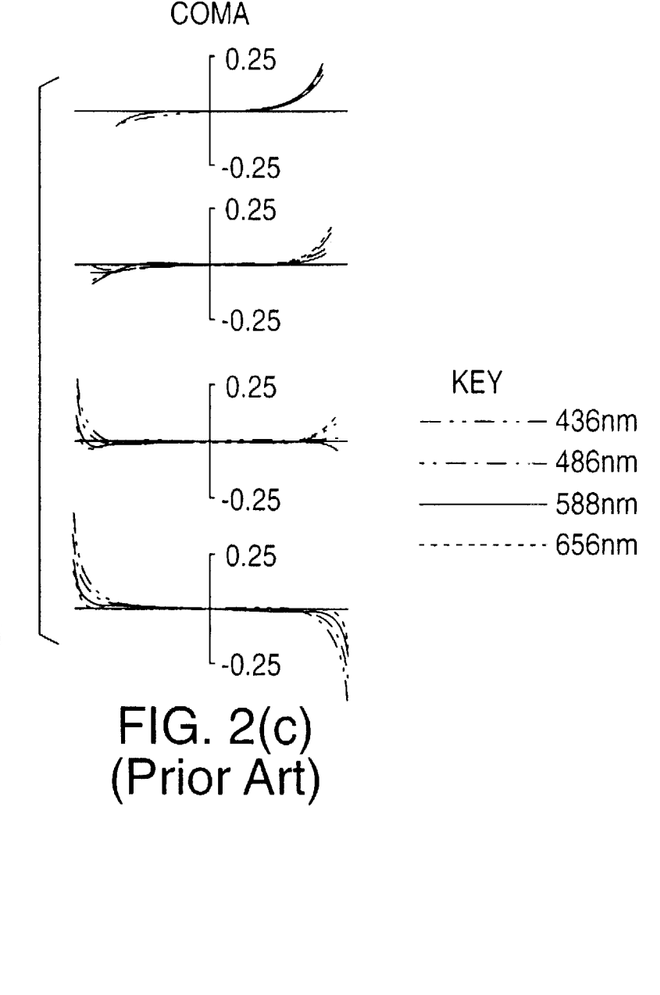

FIGS. 2(a)–2(c) are plots of the spherical aberration, astigmatism, and coma, respectively, for the comparison example. In FIGS. 2(a) and 2(c), the solid line represents the aberration curve for the standard wavelength λ=588 nm, the dashed line represents the aberration curve for wavelength λ=656 nm, the dash-dot line represents the aberration curve for wavelength λ=486 nm, and the dash-double dot line represents the aberration curve for wavelength λ=436 nm, as noted in the key at the right of the figure. In the astigmatism plot of FIG. 2(b), the solid lines represent data for the sagittal image surfaces for the various wavelengths and the dashed lines represent data for the meridional image surfaces for the various wavelengths. In FIGS. 2(a) and 2(b), FNO denotes the F number, and y denotes the image height, respectively.

Further with respect to the comparison example, Table 2 below lists the respective spherical-aberration coefficients for each face, the sum of the three-dimensional spherical aberration coefficients, and the Petzval's sum for the standard wavelength λ=588 nm.

TABLE 2

| Face No. | Spherical Aberration Coef. |
|---|---|
| 1 | 0.07839 |
| 2 | 0 |
| 3 | 0 |
| 4 | −0.37843 |
| 5 | 0 |
| 6 | −0.31763 |
| 7 | 0.3332 |
| 8 | 0.29342 |
| Sum: | 0.00894 |
| Petzval's Sum: | −0.01051 |

Referring to the condition-related values in Table 1, the aggregate focal length $f_{123}$ of the lenses L1–L3 in the comparison example is only 5.24 times the focal length f of the optical system as a whole. As a result, as can be ascertained in the various aberration plots, the comparison example exhibits a substantial chromatic aberration for the wavelength range of 436 nm through 656 nm.

From the various spherical-aberration coefficients listed in Table 2, it can be seen that the imagewise face of the first lens L1 and the objectwise face of the second lens L2 do not contribute to the correction of spherical aberration. As a result, as can be seen from the sum of the various spherical aberration coefficients, spherical aberration is not effectively corrected in the optical system of the comparison example.

From the Petzval's sum data in Table 2, it can be seen that a much image-surface curvature is exhibited by the optical system of the comparison example.

Example Embodiment 1

Figure 3:
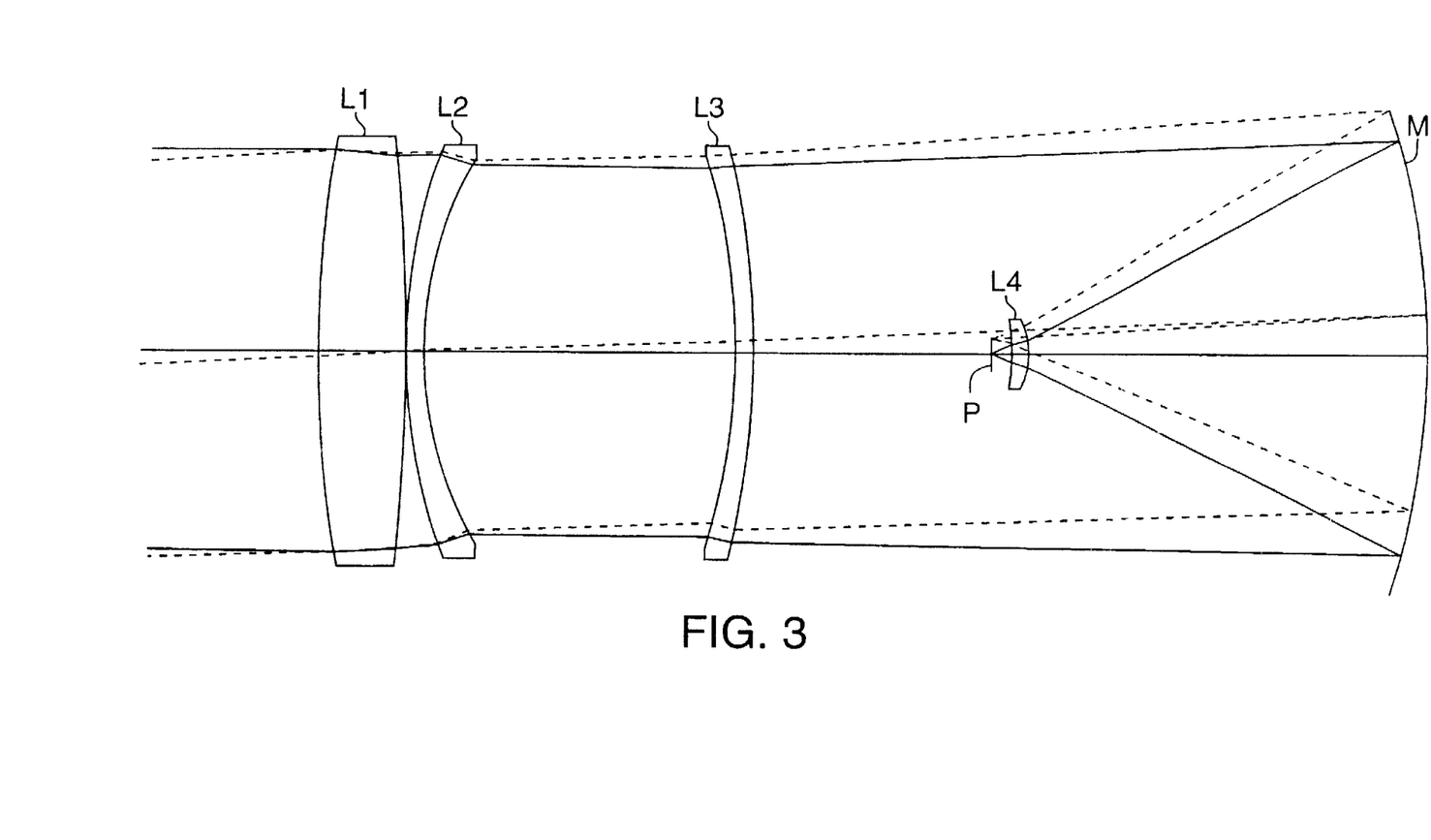
FIG. 3 is a schematic optical diagram of Example Embodiment 1 of a catadioptric optical system of the present invention.

FIG. 3 is a schematic optical diagram of a catadioptric optical system according to Example Embodiment 1.

The optical system of FIG. 3 comprises, from objectwise to imagewise, a biconvex lens L1, a negative meniscus lens L2 having a convex face oriented objectwise, a negative meniscus lens L3 having a concave face oriented objectwise, a concave spherical mirror M having a concave face oriented objectwise, and a positive meniscus lens L4 situated between the concave spherical mirror M and the third lens L3. The positive meniscus lens has a convex face oriented toward the concave spherical mirror M. Light from an object passes (from left to right in the figure) through the first lens L1, the second lens L2, and the third lens L3, and is reflected from the concave spherical mirror M. The light returns in the opposite direction through the fourth lens L4 to form an image of the object on an image plane located between the third lens L3 and the fourth lens L4.

Table 3 below lists the optical data for this example embodiment. In Table 3, f denotes the focal length of the optical system as a whole, FNO denotes the F number, 2ω denotes the field angle, Face No. denotes the surface number in order objectwise to imagewise along the propagation direction of light from the object to the image plane, r denotes the radius of curvature of the respective face, d denotes the on-axis distance between each face, ED denotes the effective diameter, and n and ν denote the refractive index and Abbe number, respectively, at a standard wavelength of λ=347 nm. The Abbe number is here defined as $$\nu = (n_{347} - 1) \, (n_{298} - n_{1100})$$

where $n_{298}$ denotes the refractive index at wavelength 298 nm, $n_{347}$ denotes the refractive index at wavelength 347 nm, and $n_{1100}$ denotes the refractive index at wavelength 1100 nm.

In Table 3 below, the sign of a radius of curvature is positive for a convex face oriented objectwise. The sign of the interfacial distance d is positive in the optical path from the object (not shown) to the concave spherical mirror M, and negative in the optical path from the concave spherical mirror M to the image plane P. In this example embodiment, the first, second, and third lenses L1, L2, and L3 are all formed from quartz.

TABLE 3

| Face No. | f = 100 | FNO = 1.00 | | 2ω = 4° | |
|---|---|---|---|---|---|
| | r | d | ED | n | ν |
| 1 | 275.932 | 20.002 | 100 | 1.47748 | 12.21 |
| 2 | −676.166 | 0.2 | 99.04 | | |
| 3 | 142.154 | 4 | 97.18 | 1.47748 | 12.21 |
| 4 | 92.738 | 74.259 | 94.28 | | |
| 5 | −168.165 | 4 | 95.76 | 1.47748 | 12.21 |
| 6 | −255.907 | 162.445 | 97.07 | | |
| 7 | −204.516 | −98.221 | 116.7 | (Concave spherical mirror M) | |
| 8 | −28.356 | −4 | 15.72 | 1.47748 | 12.21 |
| 9 | −224.954 | −3.902 | 12.91 | | |
| 10 | ∞ | | | (Image plane) | |

| Values of Conditional Expressions |
|---|
| $f_{123} = -8371.834$ |
| $f_{12} = 1338.16$ |
| $f_{12}' = -307.467$ |
| Condition (1): $|f_{123}|/f = 83.72$ |
| Condition (2): $|f_{12}/f_{12}'| = 4.35$ |

Figure 4A:
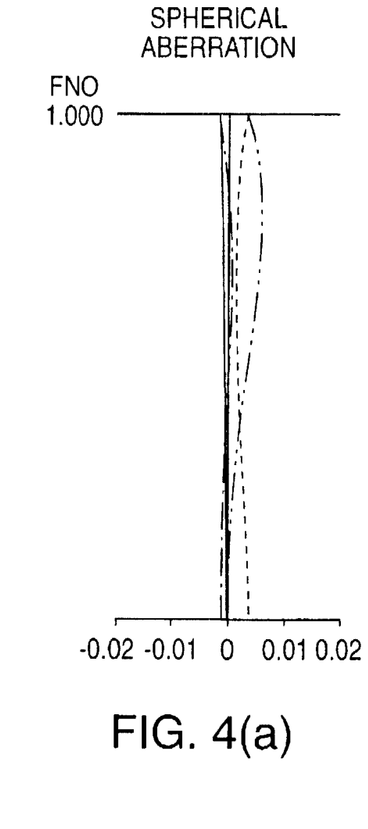
FIGS. 4(a)–4(c) are aberration plots for the catadioptric optical system of FIG. 3.
Figure 4B:
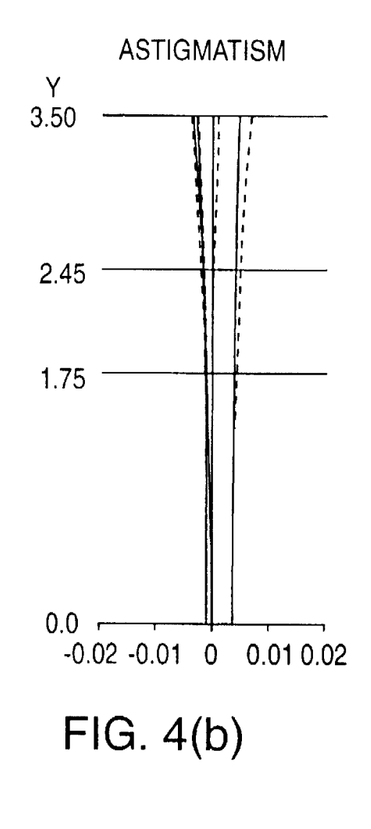
Figure 4C:
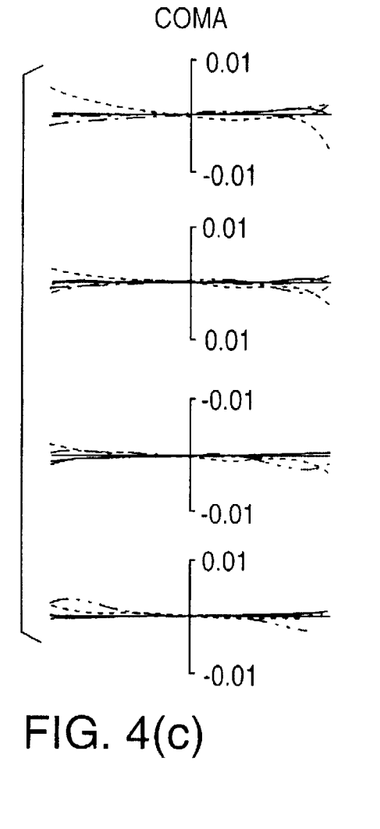

FIGS. 4(a)–4(c) are aberration plots for this example embodiment, showing spherical aberration, astigmatism, and coma, respectively. In the aberration plots of FIGS. 4(a) and 4(c), the solid line represents the aberration curve for the standard wavelength λ=347 nm, the dashed line represents the aberration curve for wavelength λ=298 nm, the dash-dot line represents the aberration curve for wavelength λ=486 nm, and the dash-double dot line represents the aberration curve for wavelength λ=1100 nm, as indicated in the Key. In FIG. 4(b), the solid lines indicate the sagittal image planes for the various wavelengths and the dashed lines indicate the meridional image planes for the various wavelengths. In FIGS. 4(a) and 4(b), FNO denotes F number, and y denotes image height, respectively.

Table 4 below shows the respective spherical aberration coefficients of the various faces, the sum of the three-dimensional spherical aberration coefficients, and Petzval's sum for the standard wavelength λ=588 nm.

TABLE 4

| Face No. | Spherical Aberration Coef. |
|---|---|
| 1 | 0.01039 |
| 2 | 0.02336 |
| 3 | 0.00389 |
| 4 | −0.16495 |
| 5 | −0.05372 |
| 6 | 0.00766 |
| 7 | 0.16557 |
| 8 | −0.01265 |
| 9 | 0.0202 |
| Sum: | −0.00025 |
| Petzval's Sum: | −0.00008 |

Referring to the values listed in Table (3), the aggregate focal length $f_{123}$ of the lenses L1–L3 in this example embodiment is 83.72 times the focal length f of the optical system as a whole. Also, the lenses L1–L3 collectively constitute a nearly afocal system. As a result, as shown in the aberration plots, chromatic aberration is effectively corrected for the wavelength range of 298 nm through 1100 nm.

From the various spherical-aberration coefficients listed in Table 4, it can be seen that the imagewise face of the first lens L1 and the objectwise face of the second lens L2 contribute to the correction of spherical aberration. As can be ascertained from the sum of the various spherical-aberration coefficients, spherical aberration is effectively corrected in the example embodiment.

From the value of Petzval's sum in Table 4, it can be seen that an optical system according to this example embodiment produces a flat image plane with little astigmatism.

Example Embodiment 2

Figure 5:
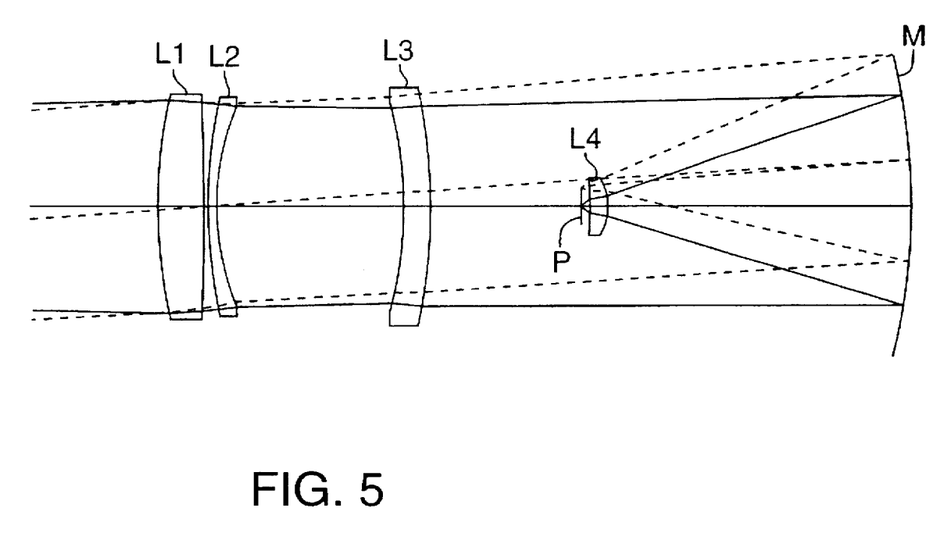
FIG. 5 is a schematic optical diagram of Example Embodiment 2 of a catadioptric optical system of the present invention.

FIG. 5 is a schematic optical diagram of a catadioptric optical system according to Example Embodiment 2. Example Embodiment 2 is used with the same wavelength range as Example Embodiment 1. However, in Example Embodiment 2, the F-number and field of view are different from those in Example Embodiment 1.

The catadioptric optical system of FIG. 5 comprises, objectwise to imagewise, a biconvex lens L1, a negative meniscus lens L2 having a convex face oriented objectwise, a negative meniscus lens L3 having a concave face oriented objectwise, a concave spherical mirror M having a concave face oriented objectwise, and a planoconvex lens L4 situated between the concave spherical mirror M and the negative meniscus lens L3. The lens L4 has a convex face oriented toward the concave spherical mirror M. Light from an object passes, left-to-right in the figure, through the first lens L1, the second lens L2, and the third lens L3. The light is reflected from the concave spherical mirror M, and returns from the mirror M right-to-left in the figure. The returning light passes through the fourth lens L4 to form an image of the object on a flat image plane P located between the third lens L3 and the fourth lens L4.

Table 5 below lists the optical data of this example embodiment 2. In Table 5, f, FNO, 2ω, Face No., r, d, ED, and n and ν are as defined above in Example Embodiment 1 at a standard wavelength of λ=347 nm. The definition of the Abbe number used here is the same as in Example Embodiment 1.

The sign of a radius of curvature is positive for convex face oriented objectwise. The sign of the interfacial distance d is positive in the optical path from the object (not shown) to the concave spherical mirror M, and negative in the optical path from the concave spherical mirror M to the image plane P. In this example embodiment, the first, second, and third lenses L1, L2, and L3 are all made from quartz.

TABLE 5

| | f = 100 | FNO = 1.43 | | 2ω = 6° | |
|---|---|---|---|---|---|
| Face No. | r | d | ED | n | ν |
| 1 | 170.65 | 13.946 | 69.73 | 1.47748 | 12.21 |
| 2 | −5457.978 | 1.59 | 69.08 | | |
| 3 | 171.31 | 3.333 | 68.57 | 1.47748 | 12.21 |
| 4 | 94.496 | 60.221 | 67.36 | | |
| 5 | −132.515 | 8.619 | 70.61 | 1.47748 | 12.21 |
| 6 | −182.818 | 153.02 | 72.76 | | |
| 7 | −205.89 | −97.025 | 93.02 | (Concave spherical mirror M) | |
| 8 | −32.777 | −5.62 | 16.95 | 1.47748 | 12.21 |
| 9 | ∞ | −2.721 | 13.69 | | |
| 10 | ∞ | | | (Image plane) | |

| Values of Conditional Expressions |
|---|
| $f_{123} = -8778.613$ |
| $f_{12} = 1340.362$ |
| $f'_{12} = -484.944$ |
| Condition (1): $|f_{123}|/f = 87.79$ |
| Condition (2): $|f_{12}/f'_{12}| = 2.76$ |

Figure 6A:
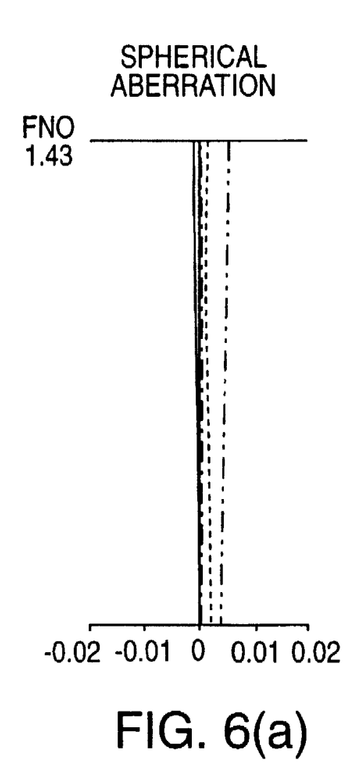
FIGS. 6(a)–6(c) are aberration plots for the catadioptric optical system of FIG. 5.
Figure 6B:
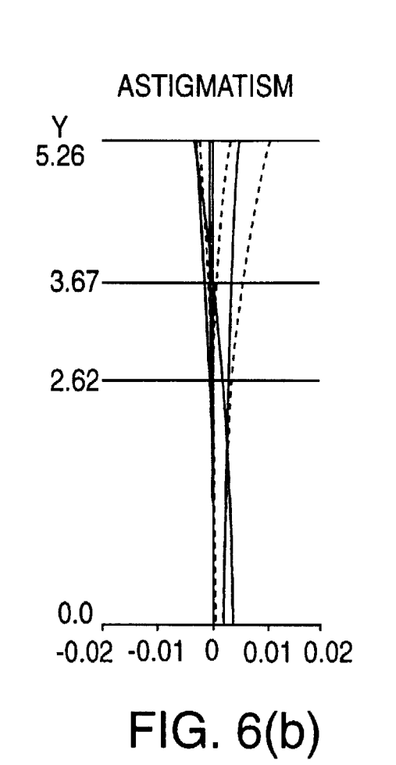
Figure 6C:
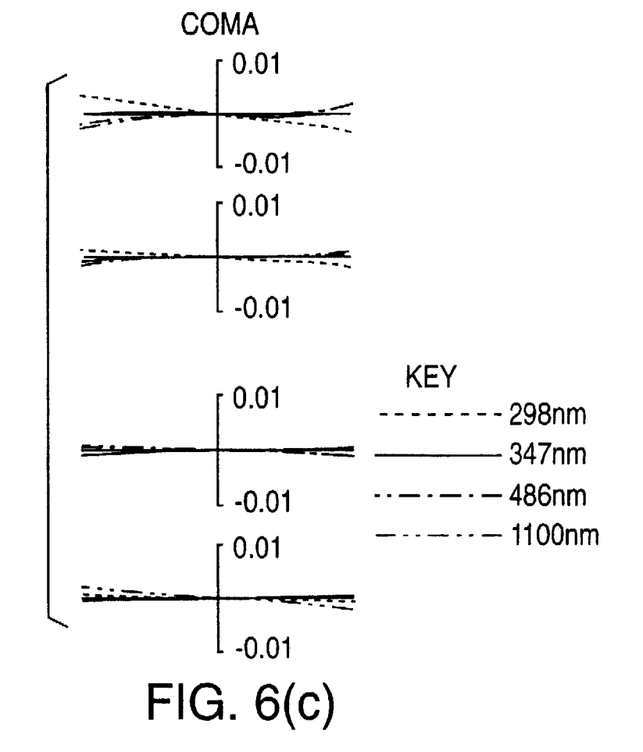

FIGS. 6(a)–6(c) are plots of aberrations exhibited by this example embodiment, namely spherical aberration, astigmatism, and coma, respectively. In FIGS. 6(a) and 6(c), the solid line represents the aberration curve for the standard wavelength λ=347 nm, the dashed line represents the aberration curve for wavelength λ=298 nm, the dash-dot line represents the aberration curve for wavelength λ=486 nm, and the dash-double dot line represents the aberration curve for wavelength λ=1100 nm, as listed in the Key. In FIG. 6(b), the solid lines represent the sagittal image planes for the various wavelengths, and the dashed lines represent the meridional image planes for the various wavelengths. In FIGS. 6(a) and 6(b), FNO denotes the F number, and y denotes the image height, respectively.

Table 6 below lists the respective spherical-aberration coefficients for each face, the sum of the three-dimensional spherical-aberration coefficients, and Petzval's sum for the standard wavelength λ=347 nm.

TABLE 6

| Face No. | Spherical Aberration Coef. |
|---|---|
| 1 | 0.04392 |
| 2 | 0.01431 |
| 3 | −0.00236 |
| 4 | −0.15195 |
| 5 | −0.10096 |
| 6 | 0.02374 |
| 7 | 0.17291 |
| 8 | −0.01451 |
| 9 | 0.0147 |
| Sum: | −0.00021 |
| Petzval's Sum: | −0.00015 |

Referring to the values of conditional expressions listed in Table 5, the aggregate focal length $f_{123}$ of lenses L1 through L3 is 87.79 times the focal length f of the optical system as a whole. Also, the lenses L1 through L3 constitute a nearly afocal system. As a result, as shown in the aberration plots, chromatic aberration is effectively corrected in this example embodiment for the wavelength range of 298 nm through 1100 nm.

From the spherical-aberration coefficients listed in Table 6, it can be seen that the imagewise face of the first lens L1 and the objectwise face of the second lens L2 contribute to the correction of spherical aberration. As a result, as can be seen from the sum of the spherical-aberration coefficients, spherical aberration is effectively corrected in this example embodiment.

From the value of Petzval's sum in Table 6, it can be seen that a flat image plane with little astigmatism is produced by this example embodiment.

Example Embodiment 3

Figure 7:
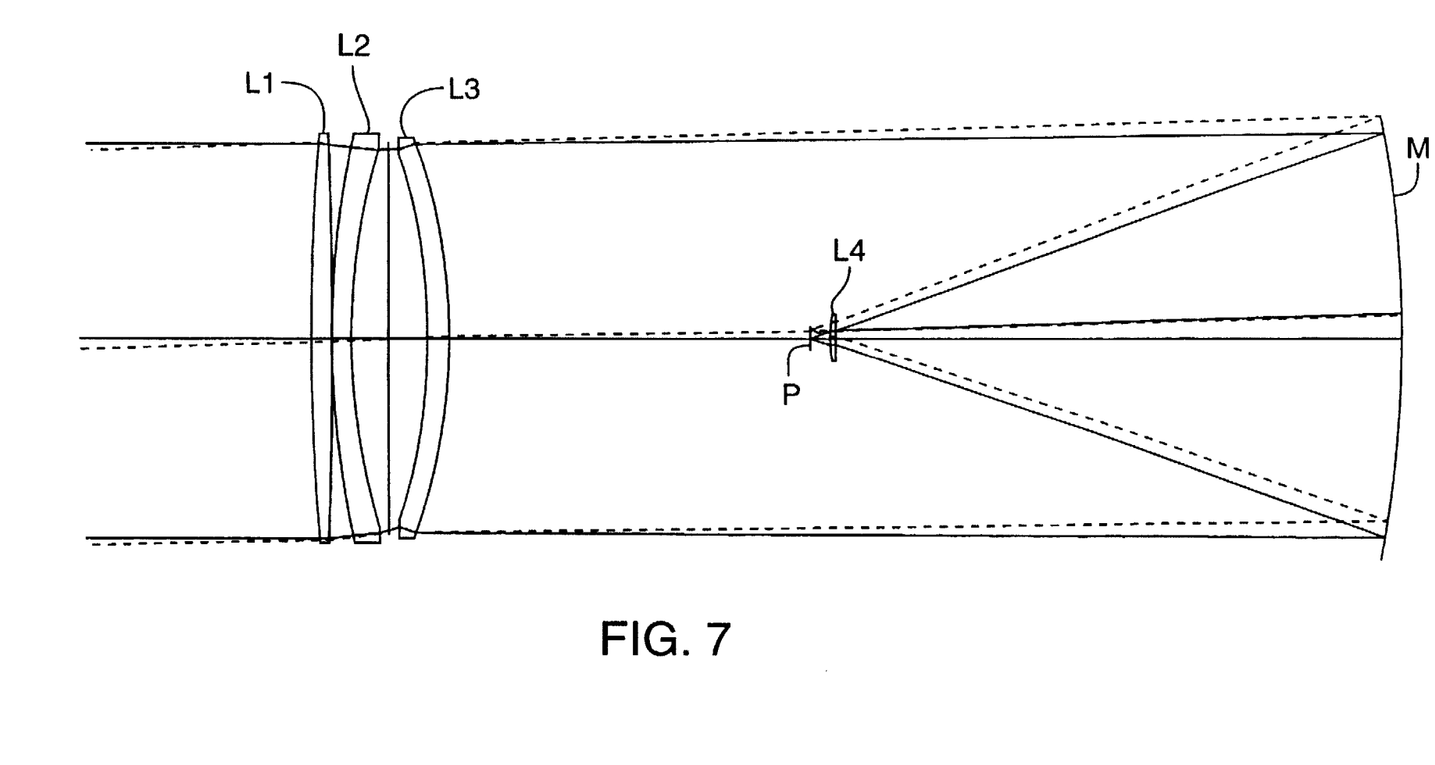
FIG. 7 is a schematic optical diagram of Example Embodiment 3 of a catadioptric optical system of the present invention.

A catadioptric optical system according to this example embodiment is shown in FIG. 7. In this example embodiment, aberrations are corrected across a wider wavelength range from the visible band to the infrared band.

The catadioptric optical system of FIG. 7 comprises, objectwise to imagewise, a planoconvex lens L1, a negative meniscus lens L2 having a convex face oriented objectwise, a negative meniscus lens L3 having a concave face oriented objectwise, a concave spherical mirror M having a concave face oriented objectwise, and a positive meniscus lens L4 situated between the concave spherical mirror M and the negative meniscus lens L3. The lens L4 has a concave face oriented toward the concave spherical mirror M. Light from an object passes (left-to-right in the figure) through the first lens L1, the second lens L2, and the third lens L3, and reflected from the concave spherical mirror M. The light returning from the mirror M (right-to-left in the figure) passes through the fourth lens L4 to form an image of the object on a flat image plane P between the third lens L3 and the fourth lens L4.

Table 7 below lists optical data for this example embodiment. In Table 7, f, FNO, 2ω, Face No., r, d, ED, n, and ν are as defined above. The refractive index and Abbe number data are obtained at a standard wavelength of λ=3000 nm. The Abbe number employed in this example embodiment is defined as $$\nu = (n_{3000}-1)/(n_{480}-n_{5000})$$

wherein $n_{480}$ denotes the refractive index at wavelength 480 nm, $n_{3000}$ denotes the refractive index at wavelength 3000 nm, and $n_{5000}$ denotes the refractive index at wavelength 5000 nm.

The sign of a radius of curvature is positive for a convex face oriented objectwise. The sign of the interfacial distance d is positive in the optical path from the object (not shown) to the concave spherical mirror M, and negative in the optical path from the concave spherical mirror M to the image plane. In this example embodiment, the lenses L1 through L3 all are formed from ZnS (zinc sulfide).

TABLE 7

| | f = 100 | FNO = 1.44 | | 2ω = 2° | |
|---|---|---|---|---|---|
| Face No. | r | d | ED | n | ν |
| 1 | 387.253 | 3.33 | 69.93 | 2.25772 | 1.35 |
| 2 | ∞ | 0.083 | 69.72 | | |
| 3 | 149.124 | 3.33 | 68.64 | 2.25772 | 1.35 |
| 4 | 118.513 | 6.576 | 67.06 | | |
| 5 | ∞ | 6.576 | 66.86 | (Aperture) | |
| 6 | −112.2 | 3.33 | 66.78 | 2.25772 | 1.35 |
| 7 | −131.481 | 166.06 | 68.05 | | |
| 8 | −202.338 | −99.313 | 77.89 | (Concave spherical mirror M) | |
| 9 | 127.233 | −0.832 | 6.47 | 2.25772 | 1.35 |

TABLE 7-continued

| | f = 100 | | FNO = 1.44 | | $2\omega = 2°$ |
|---|---|---|---|---|---|
| Face No. | r | d | ED | n | ν |
| 10 | 68.927 | −3.318 | 6.242 | | |
| 11 | ∞ | | | | (Image plane) |

| Values of Conditional Expressions |
|---|
| $f_{123} = -5458.439$ |
| $f_{12} = 792.039$ |
| $f'_{12} = -137.708$ |
| Condition (1): $|f_{123}|/f = 54.58$ |
| Condition (2): $|f_{12}|/|f'_{12}| = 5.75$ |

Figure 8A:
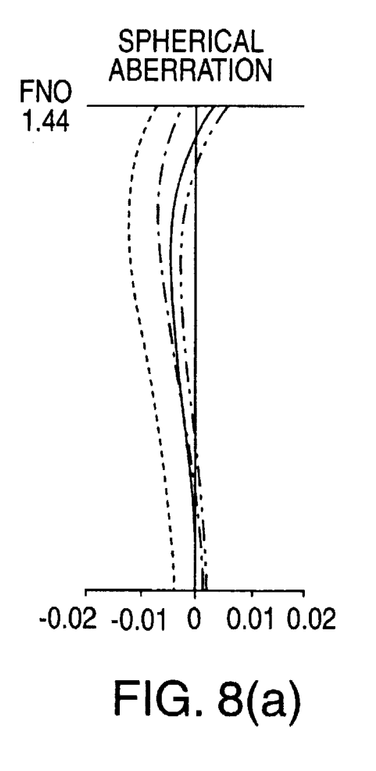
FIGS. 8(a)–8(c) are aberration plots for the catadioptric optical system of FIG. 7.
Figure 8B:
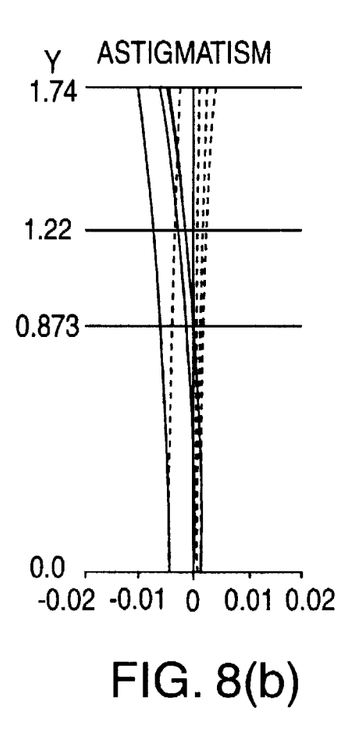
Figure 8C:
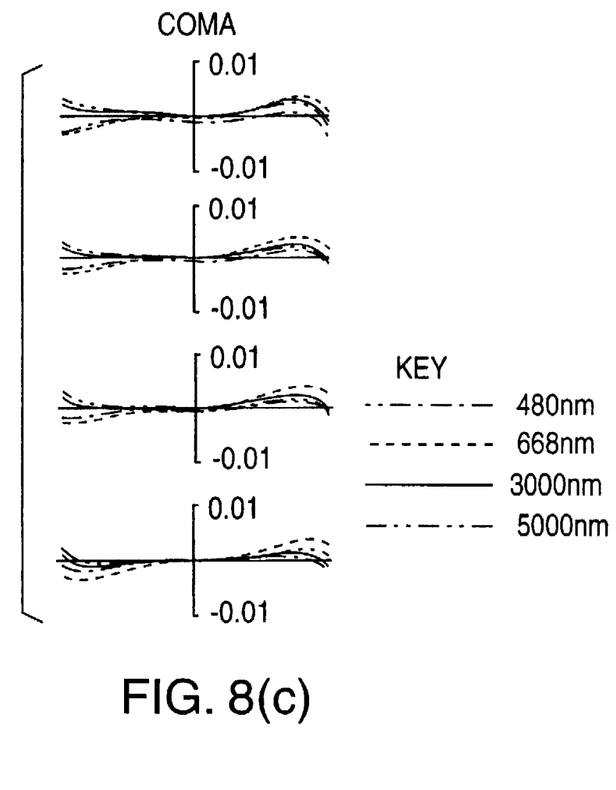

FIGS. 8(a)–8(c) are plots of aberrations for this example embodiment, namely plots of spherical aberration, astigmatism, and coma, respectively. In FIGS. 8(a) and (c), the solid line represents the aberration curve for the standard wavelength λ=3000 nm, the dashed line represents the aberration curve for wavelength λ=668 nm, the dash-dot line represents the aberration curve for wavelength λ=480 nm, and the dash-double dot line represents the aberration curve for wavelength λ=5000 nm, as listed in the Key. In FIG. 8(b), the solid lines represent the sagittal image planes for the various wavelengths and the dashed lines represent the meridional image planes for the various wavelengths. In FIGS. 8(a) and 8(b), FNO denotes the F number, and y denotes the image height, respectively.

Table 8 lists the respective spherical-aberration coefficients for each face, the sum of the three-dimensional spherical-aberration coefficients, and Petzval's sum for the standard wavelength λ=3000 nm.

TABLE 8

| Face No. | Spherical Aberration Coef. |
|---|---|
| 1 | 0.00425 |
| 2 | 0.02741 |
| 3 | −0.01125 |
| 4 | −0.04874 |
| 5 | 0 |
| 6 | −0.29052 |
| 7 | 0.08587 |
| 8 | 0.22904 |
| 9 | −0.02926 |
| 10 | 0.02973 |
| Sum: | −0.00347 |
| Petzval's Sum: | −0.00644 |

Referring to the condition-related values in Table 7, the aggregate focal length $f_{123}$ of the lenses L1 through L3 is 54.58 times the focal length f of the optical system as a whole. Also, the lenses L1 through L3 constitute a nearly afocal system. As a result, as can be seen in the various aberration plots, chromatic aberration is effectively corrected in this example embodiment for the wavelength range of 480 nm through 5000 nm.

From the various spherical-aberration coefficients in Table 8, it can be seen that the imagewise face of the first lens L1 and the objectwise face of the second lens L2 contribute to the correction of spherical aberration. As a result, as can be seen from the sum of the various spherical-aberration coefficients, spherical aberration is effectively corrected in this example embodiment.

From the value of Petzval's sum in Table 8, it can be seen that a flat image plane with little astigmatism is produced by this example embodiment.

As explained above, a catadioptric optical system according to the present invention provides an effective imaging performance while effectively correcting chromatic aberration over a wide wavelength range, and while maintaining a sufficiently small F number. Since a flat image plane can be realized especially by including a fourth lens L4, catadioptric optical systems according to the invention are suitable for use with CCD devices.

Since the lenses L1–L3 can be formed of the same optical material, and since it is not necessary to use a particularly low-dispersion optical material, a wide range of optical materials are suitable for use in lenses L1–L3. As a result, it is possible to realize large-aperture optical systems.

The various optical elements of a catadioptric optical system according to the present invention can be formed in many instances (as in the example embodiments) with spherical surfaces, so that manufacture of the various optical elements is relatively simple.

Having illustrated and demonstrated the principles of the invention in example embodiments, it should be apparent to those skilled in the art that the embodiments can be modified in arrangement and detail without departing from such principles. I claim as the invention all that comes within the scope of the following claims.

What is claimed is:

1. A catadioptric optical system comprising, objectwise to imagewise:

(a) a first lens having positive refractive power;

(b) a second lens comprising a meniscus lens having a convex face oriented objectwise;

(c) a third lens comprising a meniscus lens having a concave face oriented objectwise, the first, second, and third lenses having an aggregate focal length $f_{123}$; and (d) a concave mirror having a concave face oriented objectwise, the optical system having an overall focal length f and being arranged such that light from an object passes through the first lens, the second lens, and the third lens, and is reflected from the concave mirror to form an image of the object between the third lens and the concave mirror, and such that $$|f_{123}|/f > 10.$$

2. The catadioptric optical system of claim 1, wherein the first lens and the second lens:

(a) are formed of a specified optical material and have an aggregate focal length $f_{12}$;

(b) posses positive aggregate refractive power; and (c) fulfil the condition $$|f_{12}|/|f'_{12}| > 1$$

wherein $f'_{12}$ is a resulting focal length of a single hypothetical lens element that would be formed from the first and second lenses by filling a space between the first lens and the second lens with the specified optical material.

3. The catadioptric optical system of claim 2, further comprising a fourth lens in the optical path between the concave mirror and the image plane, the optical system being arranged such that light from an object passes through the first lens, the second lens, and the third lens, and is reflected from the concave mirror, and light returning from the concave mirror passes through the fourth lens to form an image of the object between the third lens and the fourth lens.

4. The catadioptric optical system of claim 3, wherein the first, second, and third lenses are formed of quartz.

5. The catadioptric optical system of claim 3, wherein the first, second, third lenses are formed of zinc sulfide.

6. The catadioptric optical system of claim 3, wherein the first lens is a biconvex or planoconvex lens, the second lens has a negative power, and the third lens has a negative power.

7. The catadioptric optical system of claim 3, wherein the fourth lens serves to flatten image-field curvature.

8. The catadioptric optical system of claim 3, wherein three-dimensional spherical aberration coefficients for the system as a whole have a sum having an absolute value of less than or equal to about 0.004.

9. The catadioptric optical system of claim 3, wherein three-dimensional spherical aberration coefficients for the system as a whole have a sum having an absolute value of less than or equal to about 0.0003.

10. The catadioptric optical system of claim 3, having a Petzval's sum for the system as a whole having an absolute value of less than or equal to about 0.007.

11. The catadioptric optical system of claim 3, having a Petzval's sum for the system as a whole having an absolute value of less than or equal to about 0.0002.

12. The catadioptric optical system of claim 2, wherein the specified material comprises quartz.

13. The catadioptric optical system of claim 2, wherein the specified material comprises zinc sulfide.

14. The catadioptric optical system of claim 1, further comprising a fourth lens, for correcting image plane curvature, in the optical path between the concave mirror and the image plane, the system being arranged such that light from an object passes through the first lens, the second lens, and the third lens, and is reflected from the concave mirror, and, returning from the concave mirror, passes through the fourth lens to form an image of the object between the third lens and the fourth lens.

15. The catadioptric optical system of claim 1, wherein the first, second, and third lenses are formed of quartz.

16. The catadioptric optical system of claim 1, wherein the first, second, third lenses are formed of zinc sulfide.

17. The catadioptric optical system of claim 1, wherein the first lens is a biconvex or planoconvex lens, the second lens has a negative power, and the third lens has a negative power.

18. The catadioptric optical system of claim 1, wherein the second lens consists of a meniscus lens having a convex face oriented objectwise and the third lens consists of a meniscus lens having a concave face oriented objectwise.

19. The catadioptric optical system of claim 18, wherein the second and third lenses each have a negative power.

* * * * *

UNITED STATES PATENT AND TRADEMARK OFFICE
CERTIFICATE OF CORRECTION

PATENT NO. : 5,796,515
DATED : August 18, 1998
INVENTOR(S) : Katsunuma

It is certified that error appears in the above-indentified patent and that said Letters Patent is hereby corrected as shown below:

Column 3, line 65, "$f_{12}|/|f'_{12}| > 1$" should be --$|f_{12}|/|f'_{12}| > 1$--.

Column 7, line 50, "Condition (2): $|f_{12}|/f'_{12}| = 4.35$" should be --Condition (2): $|f_{12}|/|f'_{12}| = 4.35$--.

Signed and Sealed this

Twenty-third Day of November, 1999

Attest:

Q. TODD DICKINSON

*Attesting Officer*   *Acting Commissioner of Patents and Trademarks*